US006540964B2

(12) United States Patent
Kohrmann et al.

(10) Patent No.: US 6,540,964 B2
(45) Date of Patent: Apr. 1, 2003

(54) PIPETTE FOR A PIPETTE SYSTEM

(75) Inventors: Günter Kohrmann, Kreuzwertheim (DE); Andreas Lang, Marktheidenfeld (DE); Armin Huth, Triefenstein (DE); Renate Rempt, Wertheim-Nassig (DE)

(73) Assignee: Brand GmbH + CO KG, Wertheim (DE)

( * ) Notice: Subject to any disclaimer, the term of this patent is extended or adjusted under 35 U.S.C. 154(b) by 28 days.

(21) Appl. No.: 09/739,267

(22) Filed: Dec. 19, 2000

(65) Prior Publication Data

US 2001/0005490 A1 Jun. 28, 2001

(30) Foreign Application Priority Data

Dec. 24, 1999 (DE) ........................................ 199 63 141

(51) Int. Cl.[7] ............................ B01L 3/02; G01N 1/16; G01N 1/00; G01N 1/14

(52) U.S. Cl. ....................... 422/100; 422/919; 422/923; 422/925; 73/863.25; 73/863.32; 73/863.85; 73/864; 73/864.01; 73/864.11; 73/864.13; 73/864.14; 73/864.16

(58) Field of Search ................................ 422/100, 919, 422/923, 925; 73/863.25, 863.32, 863.85, 864, 864.01, 864.11, 864.13, 864.14, 864.16

(56) References Cited

U.S. PATENT DOCUMENTS

| | | | | | |
|---|---|---|---|---|---|
| 4,084,730 | A | * | 4/1978 | Franke et al. | 222/309 |
| 4,099,548 | A | * | 7/1978 | Sturm et al. | 141/27 |
| 4,250,755 | A | * | 2/1981 | Kenney | 422/925 |
| 4,406,170 | A | * | 9/1983 | Kuhn | 222/287 |
| 4,442,722 | A | * | 4/1984 | Meyer | 422/925 |
| 4,444,062 | A | * | 4/1984 | Bennett et al. | 422/100 |
| 4,567,780 | A | * | 2/1986 | Oppenlander et al. | 422/100 |
| 4,909,991 | A | * | 3/1990 | Oshikubo | 422/100 |
| 5,002,737 | A | * | 3/1991 | Tervamaki | 222/386 |
| 5,104,624 | A | * | 4/1992 | Labriola | 141/25 |
| 5,620,660 | A | * | 4/1997 | Belgardt et al. | 403/368 |
| 5,696,330 | A | * | 12/1997 | Heinonen | 73/864.13 |
| 5,747,709 | A | * | 5/1998 | Oshikubo | 222/287 |
| 5,849,248 | A | * | 12/1998 | Homberg | 422/100 |
| 5,983,733 | A | * | 11/1999 | Strandberg et al. | 73/1.74 |
| 6,019,004 | A | * | 2/2000 | Conley et al. | 422/923 |
| 6,299,841 | B1 | * | 10/2001 | Rainin et al. | 422/100 |
| 2002/0020233 | A1 | * | 2/2002 | Baba et al. | 73/864.16 |

FOREIGN PATENT DOCUMENTS

DE 43 41 229 6/1995

* cited by examiner

*Primary Examiner*—Jill Warden
*Assistant Examiner*—Brian R Gordon
(74) *Attorney, Agent, or Firm*—Nixon Peabody LLP; David S. Safran

(57) ABSTRACT

A pipette for the handling of a syringe. The pipette has jaw chucks which are adjustably arranged with respect to the plunger receptacle, being pivotably mounted on a plunger-gripping device. The syringe is insertable with opened jaw chucks with the plunger head only partially contacting the jaw chucks. The jaw chucks are laterally engageable on the plunger head upon insertion of the syringe. The engaging movement of the jaw chucks on the plunger head is regulated according to the invention so that the engaging movement has a substantially tangential component with respect to the surface of the plunger head. As a result, a desired and form-locking connection to the plunger head of the syringe results that requires a small amount of force.

27 Claims, 7 Drawing Sheets

PIPETTE FOR A PIPETTE SYSTEM

BACKGROUND OF THE INVENTION

1. Field of the Invention

The invention pertains generally to a pipette for a pipette system. In particular, the invention is directed to a pipette for the handling of a syringe and includes jaw chucks which are adjustably arranged with respect to a plunger receptacle which is pivotally mounted on a plunger-gripping device. The syringe is received in the jaw chucks in manner such that the plunger head is in marginal contact with the jaw chucks, the jaw chucks being laterally engageable on the plunger head A upon the insertion of the syringe. The engaging movement of the jaw chucks on the plunger head is regulated in a manner such that, with respect to a surface of the plunger head, the engaging movement has a substantially tangential component. As a result, a desired and form-locking connection to the plunger head of the syringe results that requires a small amount of force.

2. Description of Related Art

German Patent DE 43 41 229 C1 discloses a pipette system in which a pipette-operated syringe can be axially inserted into the pipette, or, respectively, removed from the pipette. In such a system, the affixing of the cylinder and plunger of the syringe is made using radially adjustable cylinder-gripping and plunger-gripping levers. The cylinder-gripping lever and the plunger-gripping lever are elastically forced into their gripping position and can be brought into a releasing position against the elastic force. The invention also includes an actuating element on the pipette housing is used which is hand-operated against the elastic force.

German Patent DE 29 26 691 C2 discloses a pipette system having syringes that can be axially inserted, but are complicated regarding the design of the cylinder-gripping device and the plunger-gripping device. Pipettes having a more simplistic construction have syringes that can be radially inserted into and removed from the pipette. The present invention is based upon such a pipette.

In a conventional pipette, the cylinder-gripping device has a radially accessible and permanently mounted on the pipette housing, and is designed as a flange-like ring with a U-shaped top view having a cantilever spring found vertically above it. This cantilever spring supports the fastening section of the syringe cylinder, which is designed as a circular, projecting flange, after radial insertion. The plunger head of the syringe plunger, which juts upward from the cylinder, is lead laterally into a plunger receptacle on the plunger-gripping device simultaneously with the insertion of the cylinder flange. The plunger receptacle is formed by two flanking jaw chucks which together form a U-shape and which grip the plunger head from the side and clamp it tight during the insertion of the syringe.

An actuating device is mounted on the plunger-positioning device, and is a part of the plunger-gripping device of the plunger-positioning device. The actuating device is a hinged, clamping component that is opened upwardly for the insertion of the syringe and swung down for the final fixation of the plunger head between the jaw chucks. In the down-swing, the jaw chucks, which are already firmly on the plunger head anyway due to their own elastic force, are additionally pressed against the plunger head.

Moreover, the conventional pipette system has an axially working clamp spring which forms such an insertion bevel.

However, its elastic force must be very high in order to achieve an axial movement of the plunger in the pushed-in position despite the clamping force of the already clampingly-engaged jaw chucks.

To guarantee a secure position of an inserted plunger head between the jaw chucks, each jaw chuck is provided with an edging, and particularly with a serrated edge. With the complying choice of material for the plunger head, the edging is pressed into the material of the plunger head from the side, especially when dealing with a serrated edge, so that, in respect to the substantial axial forces which are transferred from the plunger-positioning device to the plunger head during operation, not only a friction joint between jaw chucks and plunger head results, but also, to a certain extent, a positive or form joint.

It has been seen in practice that the above-mentioned prior art construction is capable of improvement in different respects. For one, for the insertion into the pipette, a substantial lateral force must be exerted on the syringe. The syringe cylinder has no problems absorbing this force. Problems arise in plungers and plunger heads, especially with slimmer syringes. The plunger head must be pressed between the jaw chucks and the plunger-gripping device with considerable force. This force can sometimes only be applied by means of pushing on the plunger head itself If one tries to do so only through force transfer by means of the cylinder, it can occur that the plunger head breaks off or is only crooked in the plunger-gripping device making it non-functional.

Furthermore, during the insertion of the plunger head between the laterally placed jaw chucks, a positive pre-fixation of the plunger results in the axial direction also. As soon as the syringe is inserted, one can no longer axially push the plunger head (plunger not yet fully in position), which was possibly positioned somewhat too high during insertion. The syringe must be removed and then re-inserted with a fully inserted plunger.

The actuating device, designed as a hinged cover, for the plunger-gripping device must have a hand-operated element in order for it to be moved. This hand-operated element is disturbing during the operation of a hand-held pipette because it is, necessarily, axially pushed together with the plunger-positioning device in the pipette housing. On the one hand, a corresponding path must therefore be kept free for insertion into the pipette housing. On the other hand, the hand operation collides with the hand holding the pipette. Consequently, problems occur in the case of an ergonomically useful design of the pipette in which the user s hand wraps fully around the pipette housing.

SUMMARY OF THE INVENTION

The object of the invention is to overcome the aforementioned difficulties for a pipette in which a syringe is radially inserted. In accordance to the present invention, the pipette includes jaw chucks that are placed to the side of the plunger head of the syringe, and have little, if no, effect during the insertion of the syringe, and are engaged on the plunger head of the syringe only after a successful insertion of the syringe. Using this method, the more sensitive plunger head can be inserted into the plunger receptacle practically without the use of large amounts of force. Thereby, the axial pre-fixation of the plunger head is excluded so that in case of an emergency, the plunger, should it extend too far beyond the end of the cylinder, can be pushed downward even if the syringe is still in place. This can also occur automatically, for example, with an insertion bevel on the closed end of the plunger receptacle of the plunger-gripping device opposite the open end of the pipette housing. Moreover, it is possible to omit the hinged cover as an actuating device for the plunger-gripping device on the movable plunger-positioning device in the case of a corresponding design of a pipette according to the invention. More so, a fixed activating device can be relatively easily implemented for the plunger-gripping device.

In an exemplary embodiment of the present invention, the force necessary for forming an adequate, form-locking connection of the jaw chucks on the plunger head is small since an engaging or positioning movement of the jaw chucks is regulated in a manner such that it has a substantially tangential component with respect to the surface of the plunger head. In addition, the jaw chucks are provided with a serrated edge so that the production of the necessary, form-locking connection for the application of substantial axial traction results not only by convertibly pressing the serrated edge into the plunger head with very high forces, but also by cutting into the material of the plunger head following the tangential movement. It must be taken into consideration that for a normal pipette, depending on the viscosity of the liquid to be pipetted, forces up to 70 N or more must be transferred in the axial direction. Of course, every possibility of slippage between the plunger-positioning device and the plunger head must be avoided in order to adhere to the desired exactness of dosage. Thereby, this form-locking connection, created with the lowest possible forces, is of considerable importance.

Generally, the engaging movement of the jaw chuck can be created by a hand operation of the actuating device. However, it is more practical to create the higher forces applied by the serrated edge for cutting into the plunger head with hand operation of the actuating device, but to achieve the positioning itself by —the elastic force of the engaging springs. This especially makes a permanent arrangement of the actuating device on the pipette housing possible. The actuating device is only used for the application of force in the beginning and for later forcing the jaw chucks apart. Therefore, it must be ready for use only for plungers which are entirely or mostly inserted into the cylinder. Thus, the actuating device can be removed from the movable plunger-positioning device and can be permanently arranged on the pipette housing with all the advantages for the manageability of the pipette according to the invention.

The invention will be better understood and the above objects will become more apparent in the following detailed description of the preferred embodiments of the invention, with reference to the accompanying drawings.

DETAILED DESCRIPTION OF THE INVENTION

Figure 1:
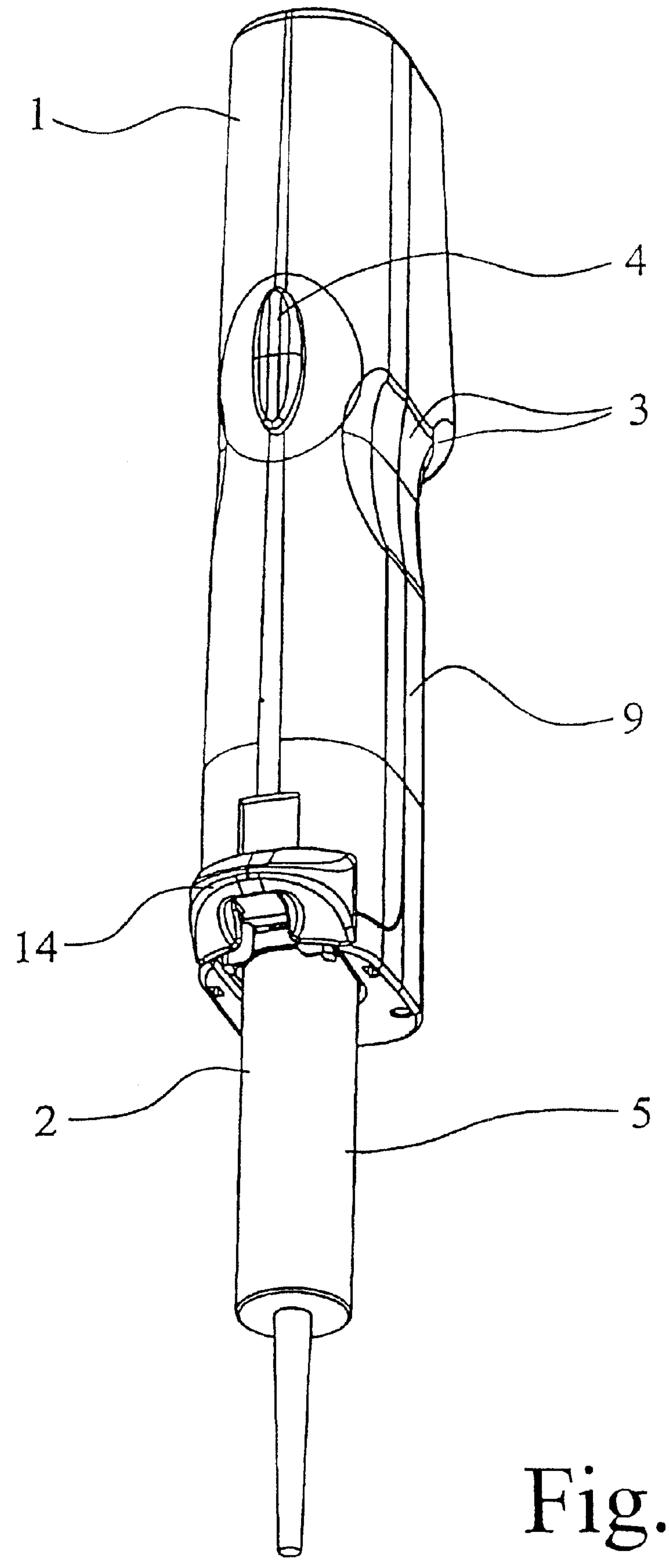
FIG. 1 is a perspective view of a pipette system made of a pipette according to the invention and a syringe mounted on it, ready for use.

Referring now to the drawings, FIG. 1 shows a perspective view of a pipette system comprising a pipette 1 and a syringe 2, the pipette including a gripping mold 3 and a motor actuator 4. While in accordance to a preferred embodiment of the present invention, the pipette 1 is a motor-actuated repetitive pipette, the teaching of the invention, however, is not limited to a motor-actuated pipette but can also be used for various types of hand-operated or motor-actuated pipettes having an inserted syringe.

Figure 4:
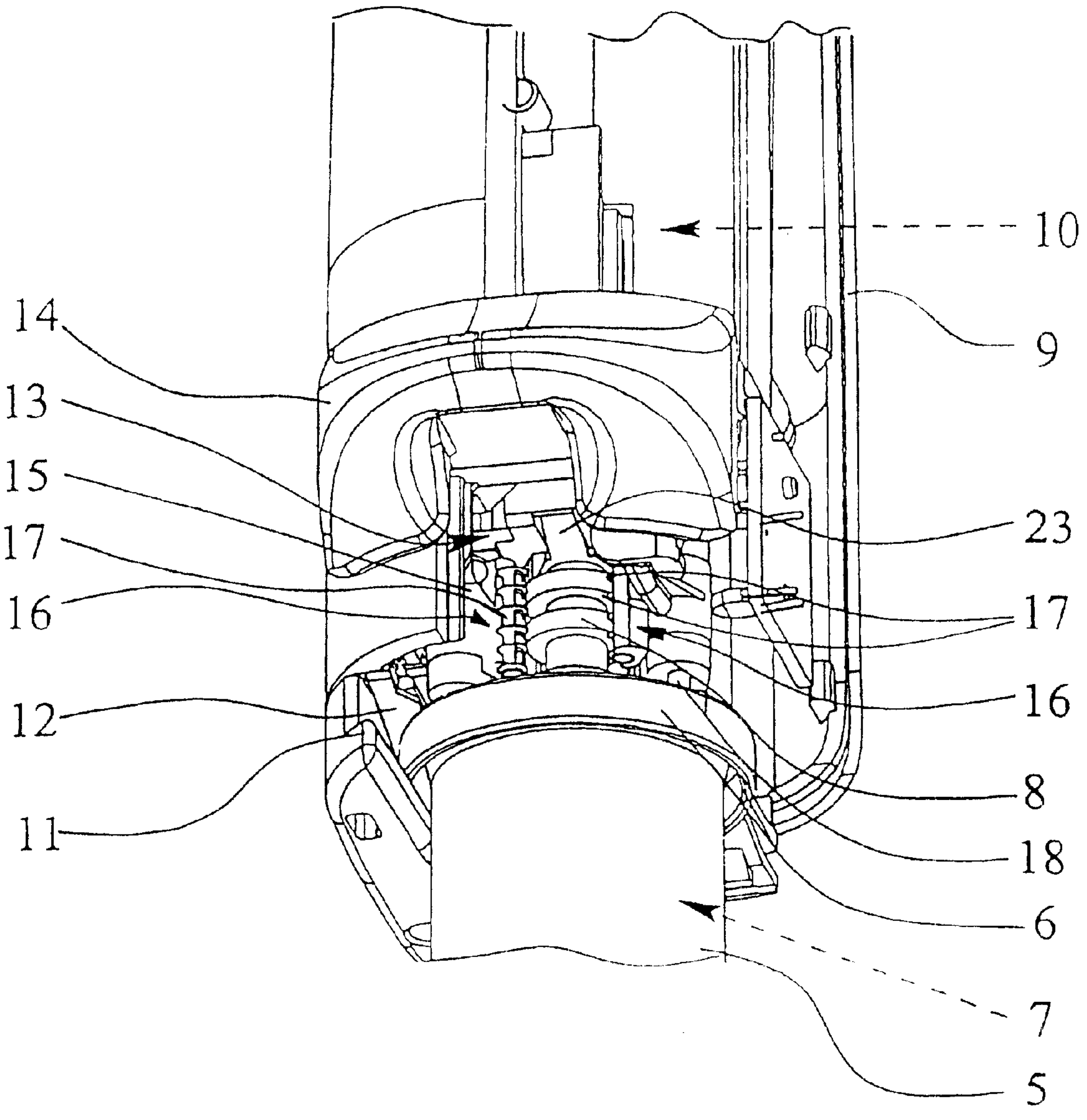
FIG. 4 is an enlarged perspective view of the area of the syringe receptacle with the housing partially opened.

FIG. 1 and FIG. 4 illustrate a syringe 2 which is inserted into the pipette 1, and which is normally available as a replacement part, and includes a cylinder 5 with a fastening section 6, designed here as a flange, as well as a plunger 7. Only the plunger head 8 of the plunger can be seen in the inserted state, extending beyond the end of the cylinder 5. The pipette I itself includes a pipette housing 9, in which an axially movable plunger-positioning device 10 is arranged. The plunger-positioning device 10 is moved by a motor in a motor-actuated pipette 1 or, in a hand-operated pipette, by step mechanics, which works, for example, using pawl and rack. A radially accessible cylinder gripping device 11 is fixedly mounted on the pipette housing 9. The cylinder gripping device 11 is designed simply as a U-shaped flange-like rim on the pipette housing 9, on which the fastening section 6 of the cylinder 5, which is designed as a circular flange, is positioned. This is tensionally affixed to the rim by a cantilever spring 12 which is also indicated in FIG. 4. A plunger-gripping device 13 for the plunger head 8 of a syringe 2 which is radially accessible and movably mounted with the plunger-positioning device 10 is provided as is an actuating device 14 for said plunger-gripping device 13.

Figure 3:
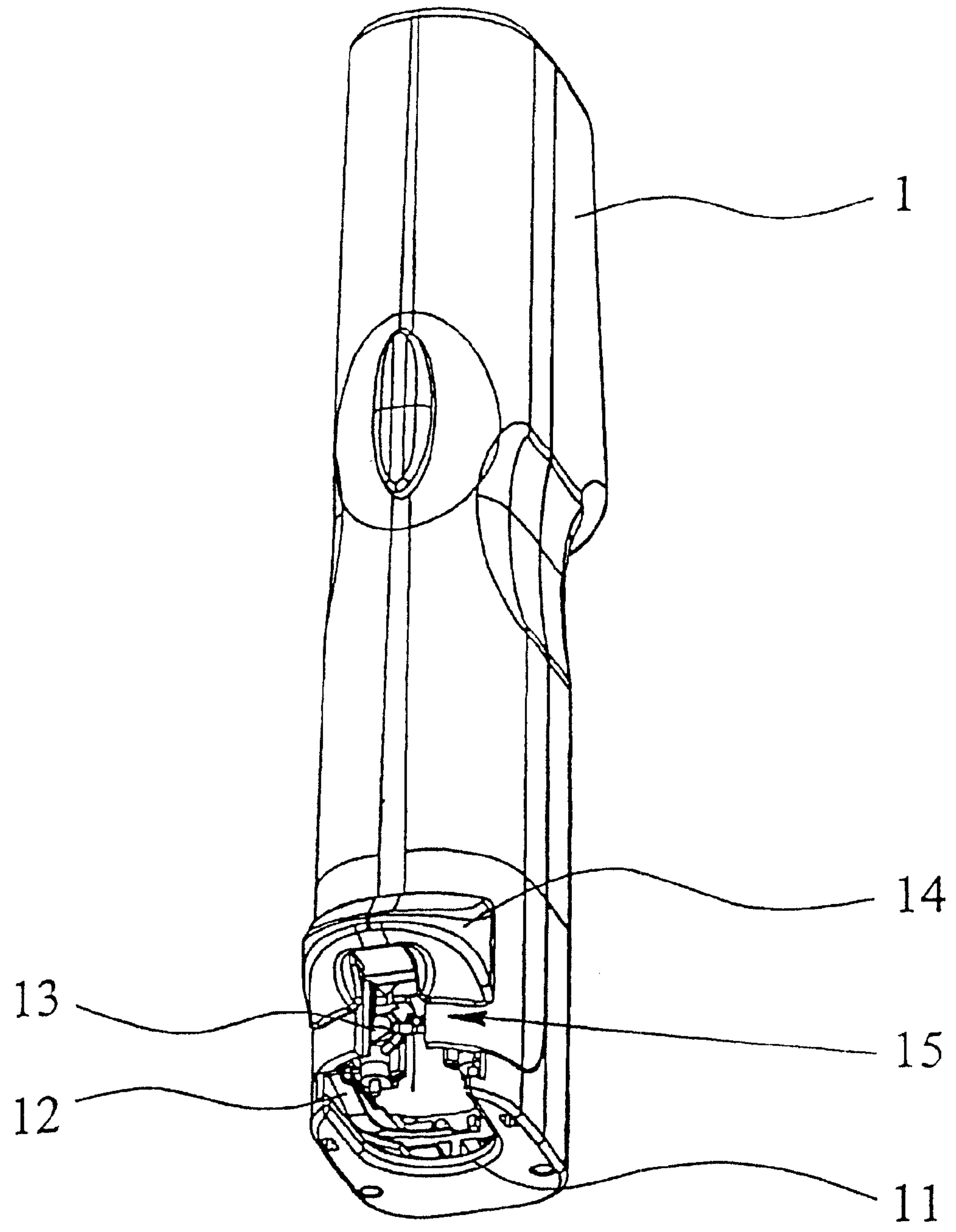
FIG. 3 is a perspective view of the pipette with the syringe being unclamped.
Figure 5:
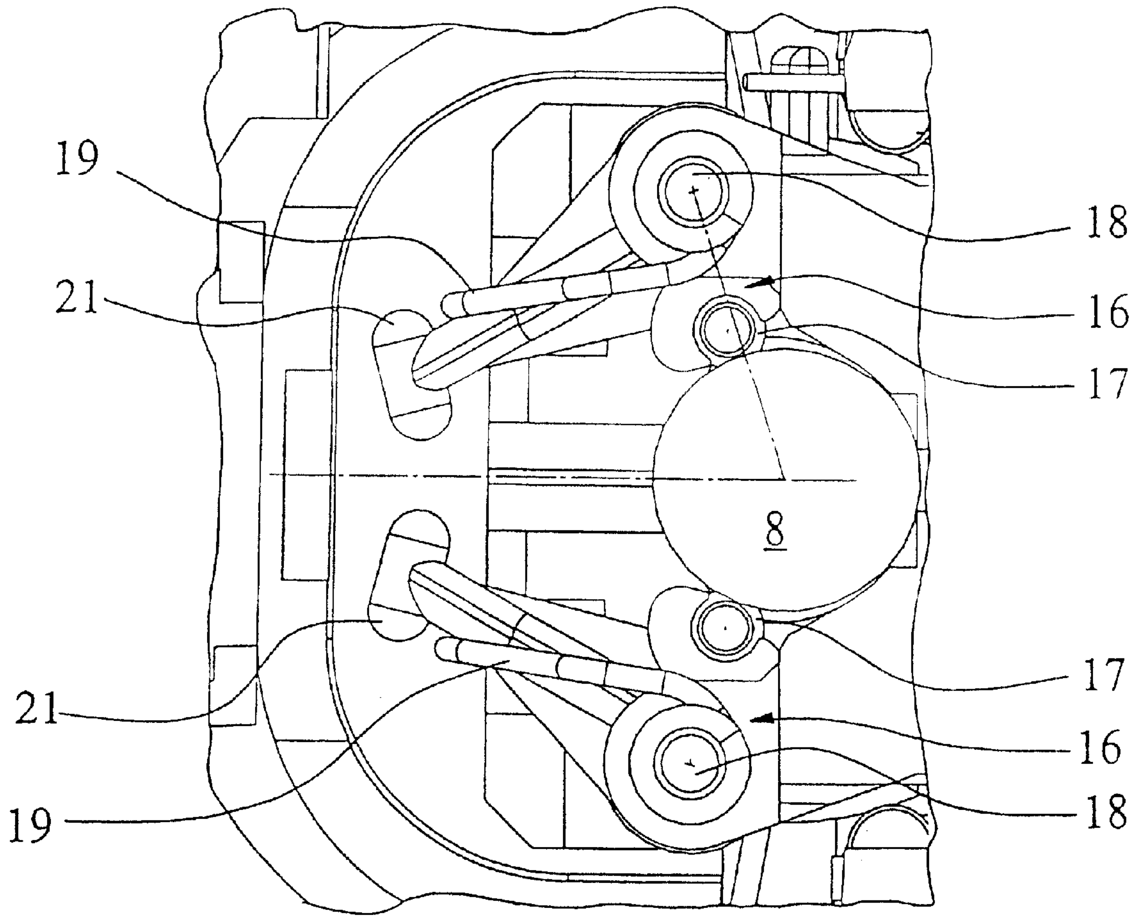
FIG. 5 is an enlarged elevational view of a plunger-gripping device of a pipette according to the invention.

FIGS. 3, 4 and 5 illustrate a position in which the syringe 2 is inserted into jaw chucks 16 of the pipette 1, the jaw chucks 16 being laterally mounted in the plunger receptacle 15 of the plunger-gripping device 13. The plunger-gripping device 13 grips the plunger head 8 of the syringe 2 with the jaw chucks 16 and holds the plunger head 8, clamping it laterally so that considerable axial force can be transmitted from the plunger-positioning device 10 to the plunger 7. As illustrated in FIG. 4 and in accordance with the preferred embodiment of the invention, the jaw chucks 16 are provided with an edge, preferably a serrated edge 17. Each jaw chuck 16 includes a total of six serrated edges 17 arranged above one another.

An advantageous aspect of the present invention is that the jaw chucks 16 are adjustably mounted in relation to the plunger receptacle 15, preferably pivotably mounted on the plunger-gripping device 13. With opened jaw chucks 16, the syringe 2 is insertable with the plunger head 8 only marginally contacting the jaw chucks 16 and, upon the insertion of the syringe 2, the jaw chucks 16 are then engageable on the plunger head 8.

FIG. 4 of the drawings illustrates an insertion bevel 23 for the plunger head 8 is arranged on the closed end of the plunger receptacle 15 opposite the open end of the pipette housing 9. By means of the insertion bevel 23, the plunger head 8 is forcefully brought into position during syringe 2 insertion, in which the plunger 7 is completely pushed into the cylinder 5. The insertion bevel 23 for the plunger head

8 can also be designed as an axially operative compression spring or can comprise such an axially operative compression spring.

The represented and preferred embodiment illustrated in FIG. 5 shows jaw chucks 16 pivotably disposed on shafts 18 preferably having pivotably disposed serrated edges 17 designed as cutting rollers. In the preferred embodiment, the engaging movement on the plunger head 8, or respectively, the surface of the plunger head 8 by the jaw chucks 16 is regulated so that it has a substantially tangential component. This is, hereby, implemented in that the shafts 18 for the jaw chucks 16 are found laterally displaced to the plunger receptacle 15 in the plunger-gripping device 13. The end position of the engaging movement of the jaw chucks 16 on the plunger head 8 lies directly before or directly after dead center. A definition of dead center is the point in which the central axis of the serrated edge 17 of the jaw chucks 16 lies exactly on the connecting line of the central axis of the plunger head 8 with the shaft 18 of the jaw chuck 16.

The embodiment in FIG. 5 shows an end position of the engaging movement of the jaw chucks 16 which lies slightly before dead center. An adequately long cut line of the serrated edge 17 is invariably striven for as is a secure fixation of the plunger head 8 between the jaw chucks 16. In addition, a position slightly after dead center is acceptable in certain cases. In addition, the pipette 1 can also be provided such that the engaging movement of the jaw chucks 16 is created by the hand-operation of the actuating device 14. FIG. 5 also shows to the left of the two-armed levers, which form the jaw chucks 16, the engager heads 21 of the jaw chucks 16. These run along the guide pieces 20 on the inside of the actuating device 14, forming the shutter in the represented embodiment.

In the embodiment of a pipette 1 in accordance to the present invention, special measures are utilized so that a good clamping effect of the jaw chucks 16 is achieved, or at least can be sustained with use of a comparably low force. It is provided in the represented embodiment that particularly the higher force needed for cutting into the material of the plunger head 8 with the serrated edge 17 of the jaw chucks 16 is created by the actuating device 14 and that the engaging of the jaw chucks 16 is sustained by the force of engaging springs 19. Moreover, the opening of the jaw chucks 16 against elastic force is the only hand operation remaining of the actuating device 14. Thus, an additional degree of freedom is won for the arrangement of the actuating device 14.

In the case of a design of the engaging movement of the jaw chucks 16 having serrated edges 17 one can, in fact, provide that only the engaging springs 19 create the necessary engaging force. They could, however, at least sustain a sufficient engaging force, as in the represented embodiment, in order to be able to transfer the substantial, axial traction required in operation. While the actuating device 14 may also be conventionally arranged on the plunger-gripping device 13, it will present the same disadvantages explained in the general part of the description. The above-mentioned concept with the engaging movement of the jaw chucks 16 by elastic force allows, however, that as implemented in the embodiment, the actuating device 14 for the plunger-gripping device 13 is mounted on the pipette housing 9. It is, thus, not moveable with the plunger-positioning, device 10 in the pipette housing 9, but is permanently arranged on the pipette housing 9.

Figure 2:
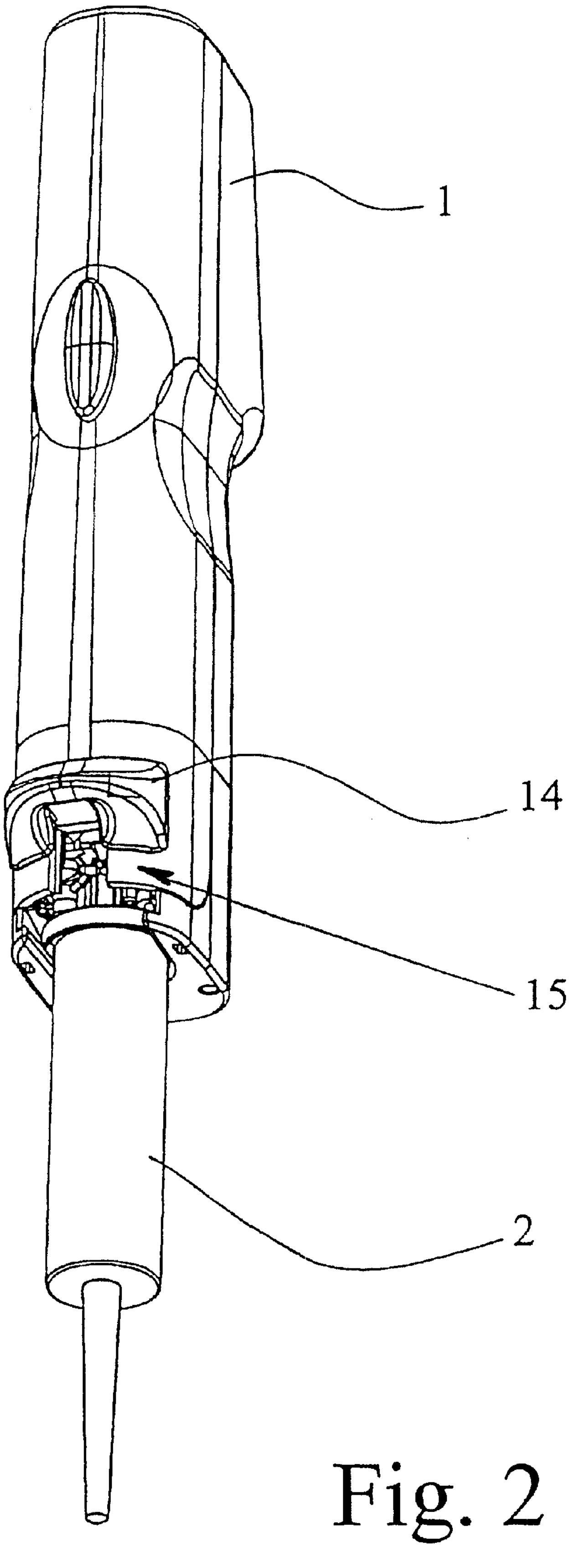
FIG. 2 is a perspective view of the pipette system having an open syringe receptacle.

Being permanently arranged on the pipette housing 9 does not necessarily mean that it can not be moved with respect to the actuating device 14 at all. In the represented and, in so far, preferred embodiment it is seen, namely, that the actuating device 14 arranged on the pipette housing 9 is designed as a closure for the plunger receptacle 15. To be exact, the actuating device 14 is designed as shutter in the represented embodiment. Of course, designs such as a hinged cover, turning lock, or similar are possible. As illustrated in FIG. 1, the shutter that forms the actuating device 14 pushed downward into the closed position, while FIGS. 2, 3, and 4 show the shutter pushed upward. In this position, the actuating device 14 gives access to the plunger receptacle 15, while it closes the plunger receptacle 15 in the position shown in FIG. 1.

The represented and preferred embodiment shown, in so far, is a construction in which the actuating device 14 releases the jaw chucks 16 when the plunger receptacle 15 is closed and, when the plunger receptacle 15 is opened, opens them against elastic force. In the closed position, as shown in FIG. 1, the plunger head 8 can be moved up and down securely coupled by means of the plunger-positioning device 10. As opposed to this, the position of the actuating device 14 represented in FIGS. 2, 3 and 4 is such that the jaw chucks 16 of the plunger-gripping device 13 are forced apart against the force of the cantilever springs 12 by means of the actuating device 14 so that the plunger head 8 is released. This corresponds to the releasing of the plunger receptacle 15 in this position, so that the syringe 2 can be completely separated from the pipette 1.

Figure 6:
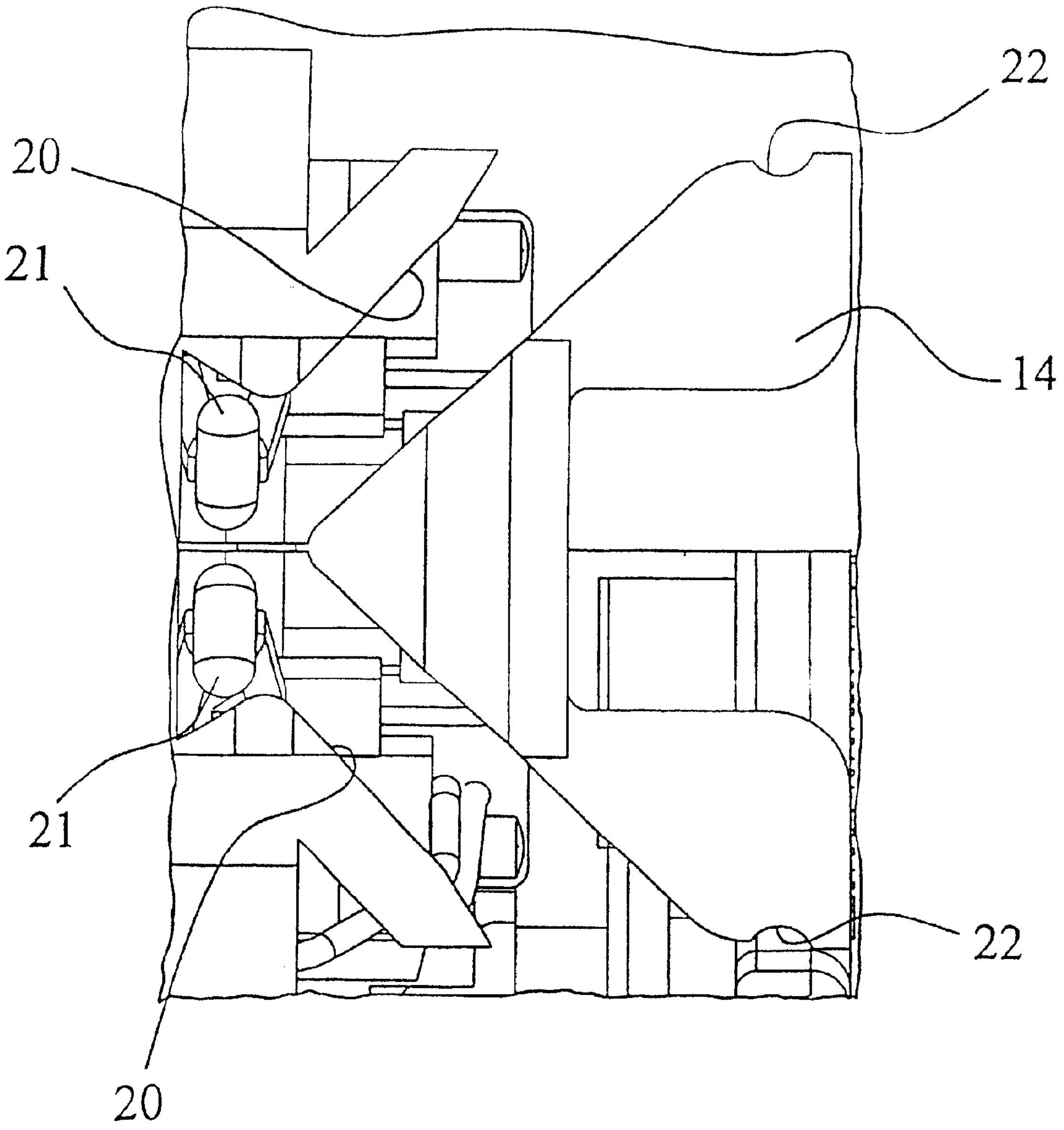
FIG. 6 is an elevational view of an actuating device for the plunger-gripping device in which the jaw chucks of the plunger-gripping device are engaged on the plunger head.
Figure 7:
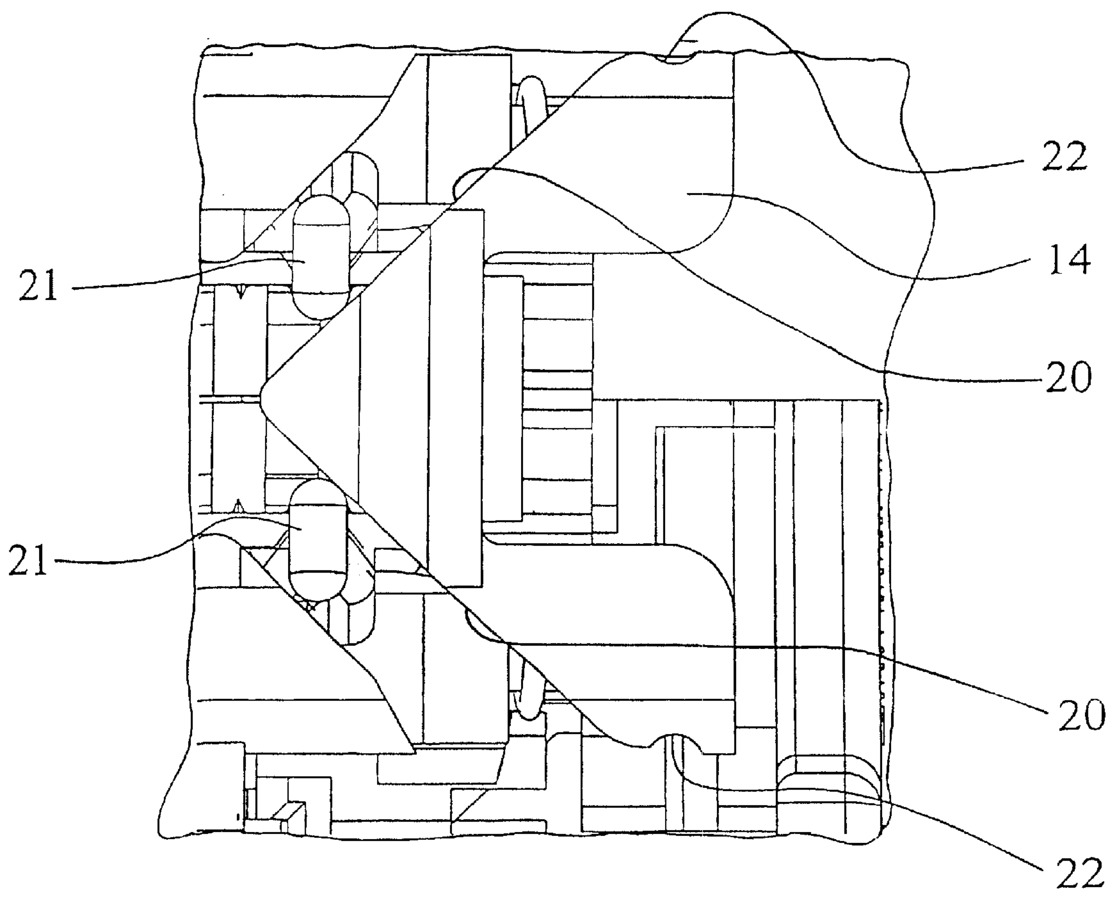
FIG. 7 is a sectional view of the actuating device with the jaw chucks of the plunger-gripping device being forced apart against the elastic force.

As illustrated in FIG. 6 and FIG. 7, the actuating device 14 has a guide piece 20 for the engager heads 21 of the jaw chucks 16, wherein the guide piece 20 is wider on the lower, open end and tapers upwardly. FIG. 6 shows the position of the engager heads 21 in relation to the guide piece 20, which corresponds to the position of the of the jaw chucks 16 in FIG. 5, i.e. the position having an affixed plunger head 8. On the other hand, FIG. 7 shows a position in which the shutter, which forms the actuating device 14, has just begun to be pushed upward into the position shown in FIGS. 2, 3 and 4. It can be seen that the engager heads 21 of the jaw chucks 16 have already been slightly forced apart by the guide piece 20. On the lower end of the guide piece 20, holding grooves 22 can be seen into which the engager heads 21 can be locked in the case of a completely opened shutter. Through this, the opening of the actuating device 14 is secured. Of course, there are many other constructive possibilities for achieving the desired result of jaw chucks 16 according to the invention which are engageable with low force. The represented embodiment, thus, represents only one preferred constructive variation.

We claim:

1. A pipette for a pipette system, said pipette comprising:

a syringe including a cylinder having a fastening section, a plunger having a head extending beyond a basal end of the cylinder;

a pipette housing, an axially moveable plunger-positioning device mounted within the pipette housing, a radially accessible cylinder-gripping device fixedly mounted on the pipette housing for gripping the fastening section, a radially accessible plunger-gripping device movably mounted within the plunger-positioning device for gripping the plunger head, and an actuating device for actuating the plunger-gripping device;

wherein the plunger-gripping device has jaw chucks adjustably mounted within a plunger receptacle of the plunger-gripping device being adjustable between an open position in which the syringe is insertable with the plunger head not or only marginally contacting the jaw chucks and a gripping position with the jaw chucks laterally and clampingly engaging on the plunger head of the syringe, wherein in the gripping position, the jaw chucks are clamping the plunger head laterally in a manner without a substantial amount of axial force transmitted from the jaw chucks to the plunger, such that a substantially large amount of axial force can be transmitted from the plunger-positioning device to the plunger.

2. The pipette according to claim 1, wherein the jaw chucks are pivotably mounted on the plunger-gripping device.

3. The pipette according to claim 1, wherein during the clamping of the plunger head by the jaw chucks, an engaging movement of the jaw chucks is regulated in a manner such that the engaging movement has a substantially tangential component with respect to a contact surface of the plunger head.

4. The pipette according to claim 2, wherein during the clamping of the plunger head by the jaw chucks, an engaging movement of the jaw chucks is regulated in a manner such that the engaging movement has a substantially tangential component with respect to a contact surface of the plunger head.

5. The pipette according to claim 3, wherein an end position of the engaging movement of the jaw chucks on the plunger head lies approximately slightly before dead center.

6. The pipette according to claim 4, wherein an end position of the engaging movement of the jaw chucks on the plunger head lies approximately before dead center.

7. The pipette according to claim 1, wherein the serrated edges of the jaw chucks are in the form of cutting rollers.

8. The pipette according to claim 2, wherein the serrated edges of the jaw chucks are in the form of cutting rollers.

9. The pipette according to claim 1, wherein the engaging movement of the jaw chucks is manually actuatable by the actuating device.

10. The pipette according to claim 1, wherein at least one engaging spring is provided for actuating the engaging movement of the jaw chucks by elastic force; and wherein the actuating device has means for manually opening of the jaw chucks against said elastic force.

11. The pipette according to claim 1, wherein the actuating device is mounted on the plunger-positioning device.

12. The pipette according to claim 1, wherein the actuating device is mounted on the pipette housing.

13. The pipette according to claim 12, wherein the actuating device is a closure for the plunger receptacle.

14. The pipette according to claim 13, wherein the actuating device is a shutter.

15. The pipette according to claim 13, the actuating device is a means for releasing the jaw chucks when the plunger receptacle is closed and for causing the plunger receptacle to open against the force of the at least one engaging, spring.

16. The pipette according to claim 15, wherein the jaw chucks include engager heads; and wherein the actuating device includes an internal guide piece for the engager heads.

17. The pipette according to claim 16, wherein the guide piece tapers upwardly and is wider on a lower, open end of the actuating device.

18. The pipette according to claim 16, wherein the guide piece has holding grooves on an end which faces the jaw chucks when the plunger receptacle is closed, and wherein the engager heads are locked in the holding grooves so that the actuating device is secured in the open position of the plunger receptacle.

19. The pipette according to claim 2, wherein the actuating device is mounted on the pipette housing.

20. The pipette according to claim 19, wherein the actuating device is a closure for the plunger receptacle.

21. The pipette according to claim 20, wherein the actuating device is a shutter.

22. The pipette according to claim 21, wherein the actuating device has means for releasing the jaw chucks when the plunger receptacle is closed and for causing the plunger receptacle to open against the force of the at least one engaging spring.

23. The pipette according to claim 22, wherein the jaw chucks includes engager heads; and wherein the actuating device includes an internal guide piece for the engager heads.

24. The pipette according to claim 23, wherein the guide piece tapers upwardly and is wider on a lower, open end of the actuating device.

25. The pipette according to claim 24, wherein the guide piece has holding grooves on an end which faces the jaw chucks when the plunger receptacle is closed, and wherein the engager heads are locked in the holding grooves so that the actuating device is secured in the open position of the plunger receptacle.

26. The pipette according to claim 1, wherein the plunger head further includes an insertion bevel mounted on a closed end of the plunger receptacle opposite to an open end of the pipette housing, the insertion bevel including an axially operative compression spring.

27. The pipette according to claim 1, wherein the jaw chucks of the plunger-gripping device are provided with serrated edges.

* * * * *